United States Patent [19]

Yap

[11] Patent Number: 5,449,854

[45] Date of Patent: Sep. 12, 1995

[54] METHOD AND INCINERATOR FOR INCINERATING HALOGENATED ORGANIC COMPOUNDS

[75] Inventor: Loo T. Yap, Princeton, N.J.

[73] Assignee: The BOC Group, Inc., New Providence, N.J.

[21] Appl. No.: 157,515

[22] Filed: Nov. 26, 1993

[51] Int. Cl.[6] .......................... A62D 3/00; F23D 5/00; F23D 3/00
[52] U.S. Cl. ........................... 588/206; 110/212; 110/344; 110/345; 588/207; 588/209; 588/900
[58] Field of Search .............. 588/205, 218, 206, 207, 588/208, 209, 900; 431/5, 9; 110/245, 212, 214, 215, 345, 346

[56] References Cited

U.S. PATENT DOCUMENTS

| | | | |
|---|---|---|---|
| 4,101,632 | 7/1978 | Lambert et al. | 423/210 |
| 4,215,095 | 7/1980 | Harri et al. | 588/209 |
| 4,519,993 | 5/1985 | McGill et al. | 423/235 |
| 4,762,074 | 8/1988 | Sorensen | 110/346 |
| 5,238,665 | 8/1993 | Lerner | 423/240 S |
| 5,269,235 | 12/1993 | McGill et al. | 588/206 |

Primary Examiner—Gary P. Straub
Attorney, Agent, or Firm—David M. Rosenblum; Larry R. Cassett

[57] ABSTRACT

A method and an incinerator in which halogenated organic compounds are burned in the presence of oxygen or oxygen enriched air to produce combustion products. The combustion products potentially include unreacted oxygen and halogenated organic compounds which can react with oxygen to produce halogenated furans and dioxins. The formation of the halogenated furans and dioxins is minimized by firing a burner, burning a hydrogen containing fuel at a fuel-rich stoichiometry, into the combustion products so that the fuel will react with the unreacted oxygen. This will reduce formation of the halogenated furans and dioxins. Any of the halogenated furans and dioxins that are formed are substantially eliminated by the reaction of hydrogen supplied by the fuel with the halogenated furans and dioxins.

5 Claims, 5 Drawing Sheets

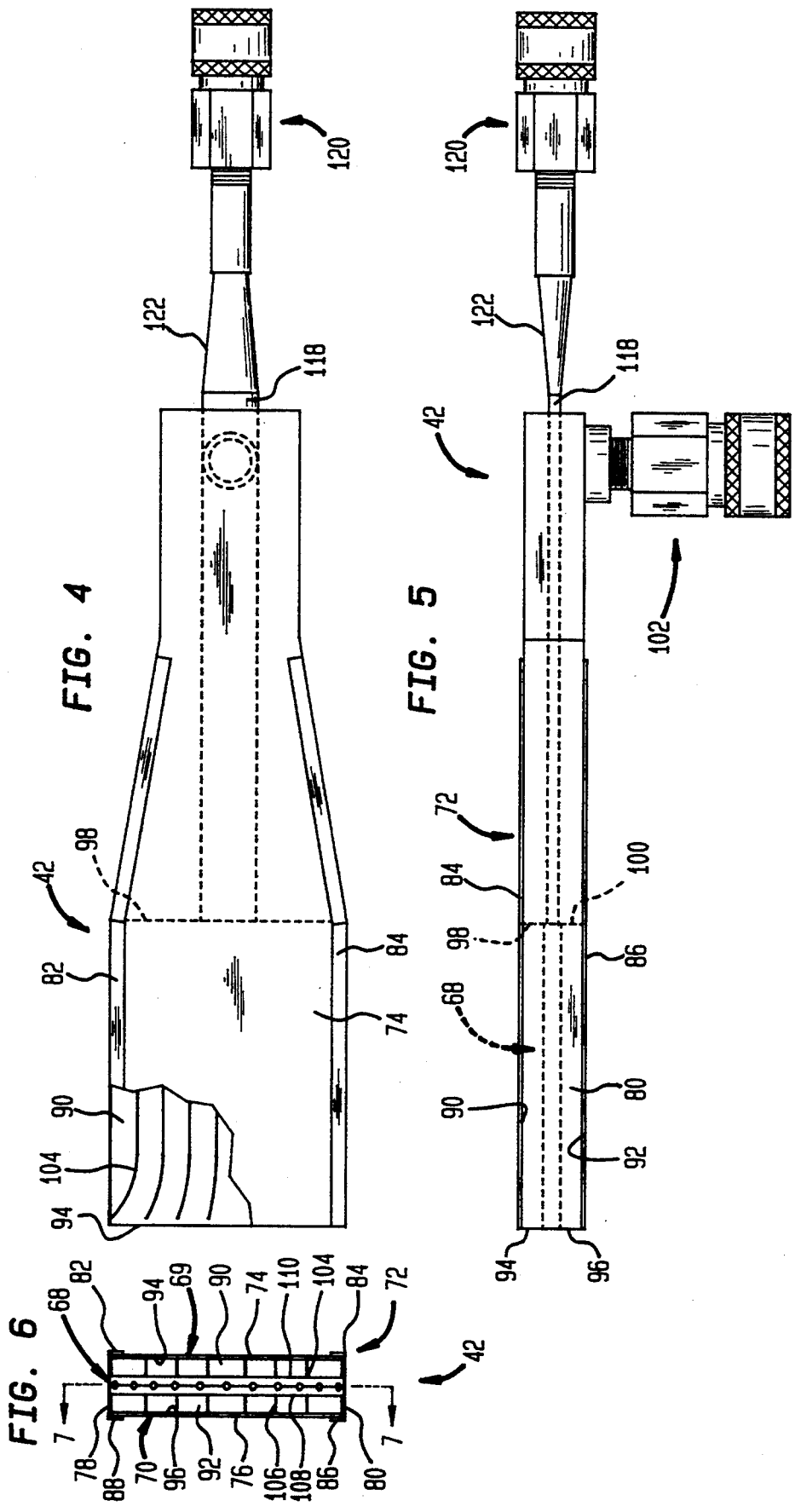

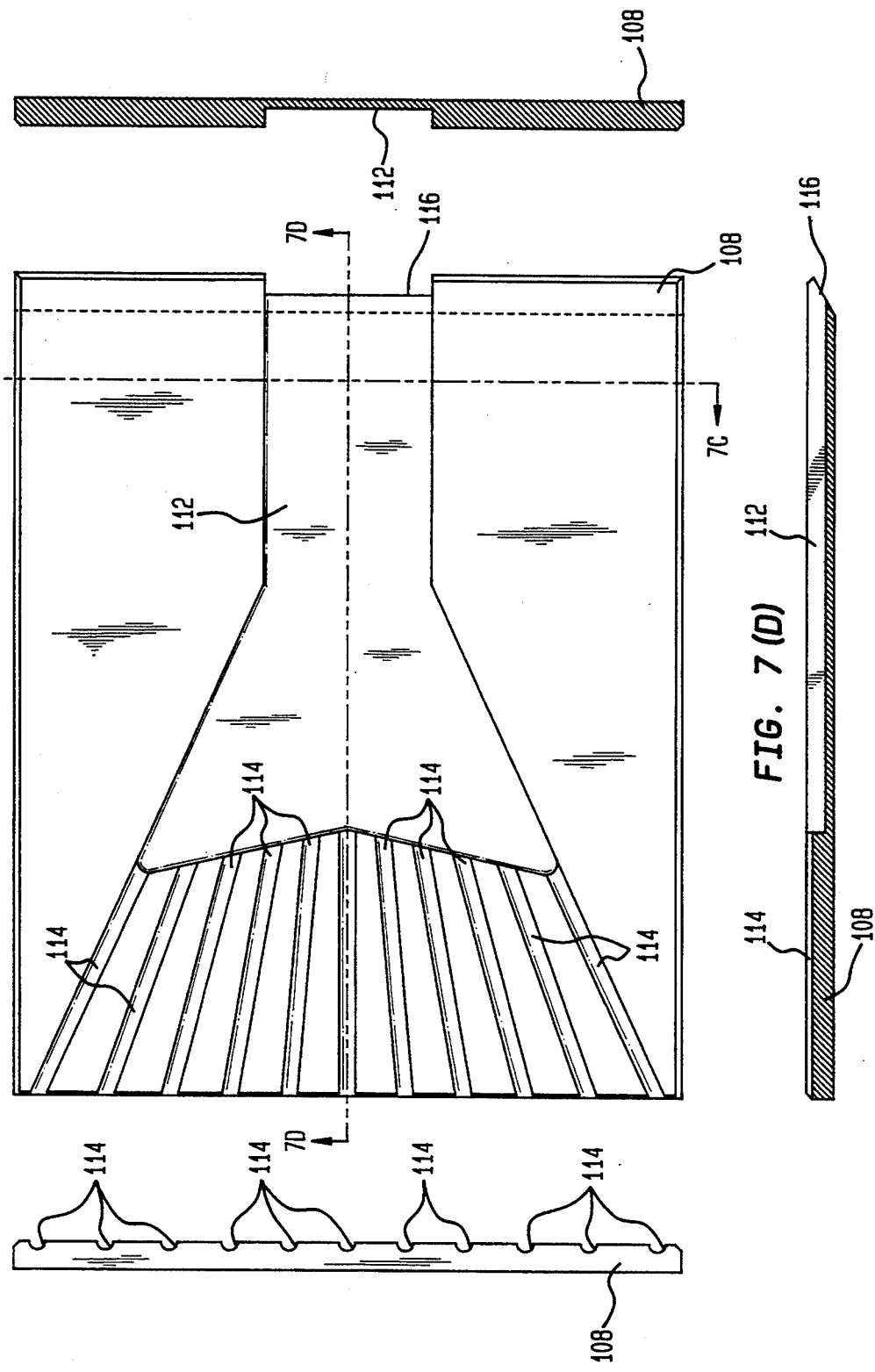

5,449,854

METHOD AND INCINERATOR FOR INCINERATING HALOGENATED ORGANIC COMPOUNDS

BACKGROUND OF THE INVENTION

The present invention relates to a method and an incinerator for incinerating halogenated organic compounds such as PCB's, solvents and by-products of chemical and pharmaceutical production. More particularly, the present invention relates to such a method and incinerator in which the halogenated organic compounds possibly in combination with a heating-value boosting fuel are incinerated in the presence of oxygen or oxygen-enriched air and the combustion products of such incineration are introduced into a post-combustion zone in which a hydrogen-containing fuel is burned in the presence of oxygen at a fuel-rich stoichiometry to minimize formation of polyhalogenated furans and dioxins.

Halogenated organic compounds, for instance PCB's and etc., must be disposed of as a hazardous waste. Generally, such materials are treated by incineration in an incinerator. Ideally, as a result of the incineration, carbon atoms are converted to carbon dioxide, hydrogen atoms form water and halogens are combusted in hydrogen to form HCl, HBr, HF and HI.

The incineration is carried out by burning the halogenated organic compounds in the presence of a surplus of oxygen. If the incineration is carried out under oxygen-lean conditions, there exists the danger that some of the halogenated organic compounds will be, at best, only partially oxidized. These partially oxidized chlorocarbons are generally very toxic. On the other hand, the usual oversupply of oxygen can cause the halogenated compounds to form halogenated furans and dioxins in trace concentrations. However, even trace mounts of these compounds, such as 2,3,7,8-tetrachlorodibenzodioxin are undesirable because they represent some of the most potent known carcinogens.

As will be discussed, the present invention provides a method and an incinerator by which halogenated organic compounds are incinerated such that the formation of polyhalogenated furans and dioxins is minimized.

SUMMARY OF THE INVENTION

The present invention provides a method of incinerating halogenated organic compounds. In accordance with the method, the halogenated organic compounds are incinerated in the presence of excess oxygen or oxygen enriched air to produce a main combustion product stream including halogenated furans and dioxins, unreacted oxygen and halogen-containing organic compounds. A hydrogen containing fuel is burned at a fuel-rich stoichiometry in the presence of additional oxygen to produce a reactive combustion product stream therefrom that contains unburned hydrogen-containing fuel and hydrogen supplied by the fuel. The reactive combustion product stream is supplied to the main combustion product stream so that the unreacted oxygen reacts with the unburned hydrogen containing fuel to reduce formation of the halogenated furans and dioxins that otherwise would have been formed in the main combustion product stream through reactions between the unreacted oxygen and the halogen containing organic compounds and the halogenated furans and dioxins that are present within the main combustion product stream react with the hydrogen supplied by the fuel and are decomposed through dehalogenation reactions. The reactive combustion product stream is added to the main combustion product stream at a temperature lower than that of the incineration. After the exposure of the main combustion product stream to the burning of the hydrogen-containing fuel, the combustion products are discharged as an exhaust. The concentration of the halogenated furans and dioxins is less than that would otherwise been produced within the combustion products contained within the exhaust.

In another aspect, the present invention provides an incinerator for incinerating halogenated organic compounds. The incinerator comprises an incineration zone, a post-combustion zone and an exhaust. The incinerator zone has means for incinerating the halogenated organic compounds in the presence of oxygen or oxygen-enriched air. The result of such incineration is to produce combustion products potentially including halogenated furans and dioxins. The halogenated furans and dioxins are produced through reactions between unreacted oxygen and halogen-containing organic compounds also potentially present within the combustion products. The post-combustion zone is in communication with the incineration zone and at least one burner fires into the post-combustion zone. The at least one burner has fuel and oxygen inlets and means for burning, at a fuel-rich stoichiometry, a hydrogen-containing fuel in the presence of oxygen. As a result of the burning, the unreacted oxygen reacts with the fuel to reduce formation of the halogenated furans and dioxins and the halogenated furans and dioxins that have been produced react with the hydrogen supplied by the fuel and decompose through dehalogenation reactions. The exhaust is in communication with the post-combustion zone so that the combustion products pass through the post-combustion zone and then through the exhaust.

The method or incinerator outlined above act to reduce the concentration of the halogenated furans and dioxins that otherwise would have been produced within the combustion products passing through the exhaust.

BRIEF DESCRIPTION OF THE DRAWINGS

While the specification concludes with claims distinctly pointing out the subject matter that Applicant regards as his invention, it is believed that the invention will be better understood when taken in conjunction with the accompanying drawings in which:

FIG. 4 is a top plan view of an oxy-fuel burner used in the incinerator of FIG. 2;

FIG. 5 is an elevational view of FIG. 3;

FIG. 6 is a front elevational view of FIG. 3;

FIG. 7(A) is a fragmentary or a sectional view taken along line 7—7 of FIG. 6;

FIG. 7(B) is a fragmentary, front elevational view of FIG. 7(A);

FIG. 7(C) is a fragmentary, cross-sectional view taken along line 7C—7C of FIG. 7(A); and FIG. 7(D) is a fragmentary, cross-sectional view taken along line 7D—7D of FIG. 7(A).

DETAILED DESCRIPTION

Figure 1:
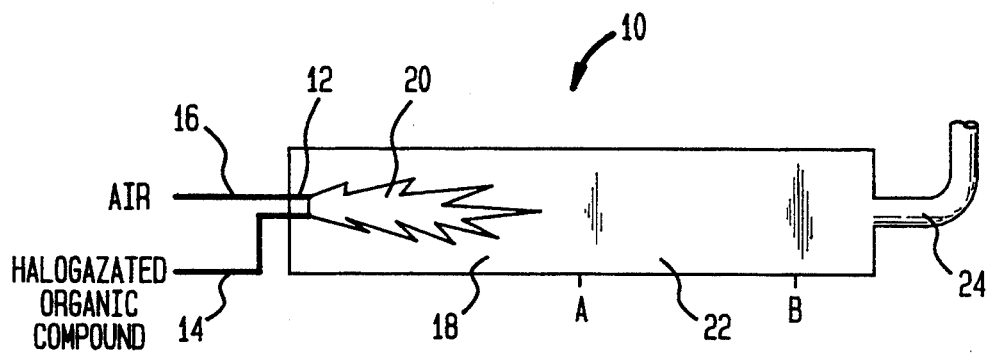
FIGS. 1 (A), (B) and (C), are respectively: a schematic of an incinerator of the prior art, a graph of temperature versus distance within the incinerator, and a graph of oxygen percentage versus distance within the incinerator.
Figure 1:
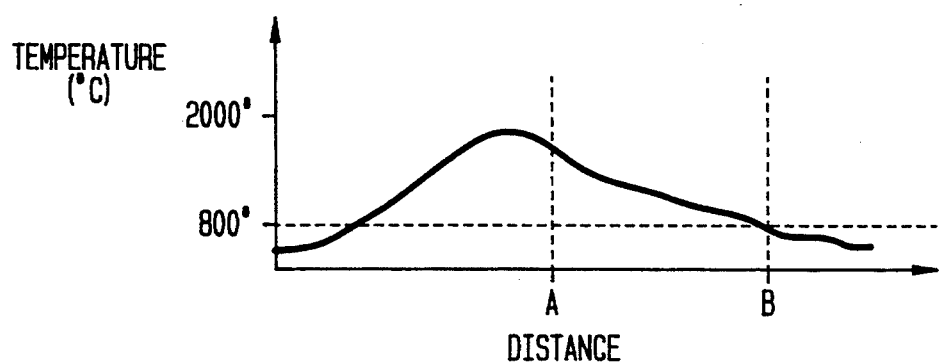
Figure 1:
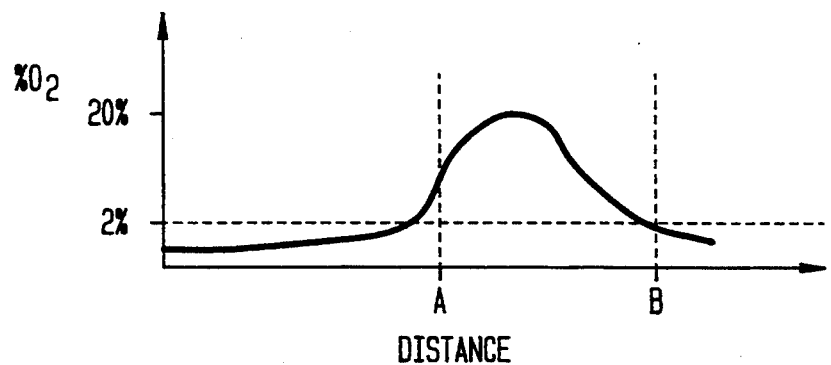

With reference to FIGS. 1(A)-(B), a prior art incinerator 10 is illustrated. Incinerator 10 is provided with a burner 12 for burning a halogenated organic compound that enters burner 12 via fuel line 14. In case of hazardous wastes with heating values too low to sustain flames, a higher heating-value fuel or waste is blended in and or co-fired. Air supplies the oxidant and enters burner 12 via oxidant line 16. The halogenated organic compound is incinerated within an incineration zone 18 of incinerator 10 and as illustrated burns with a flame 20. The combustion products then enter a cooling or post-combustion zone 22 and are then expelled from incinerator 10 via an exhaust 24.

At temperatures higher than approximately 800° C., halogenated furans and dioxins will form in post-combustion zone 22 in the presence of oxygen that has not reacted with the halogenated organic compounds. The conditions necessary for formation of halogenated furans and dioxins are present within incinerator 10 in a zone between the peak temperatures within incinerator 10 and approximately 800° C. as indicated by reference letters A and B. In this zone oxygen is present in volume concentrations of between 2 and 20 percent. Typically, incinerators operate with exhaust oxygen concentrations around 10–15% to prevent oxygen-lean pockets within the incinerator during transients or upsets.

Figure 2A:
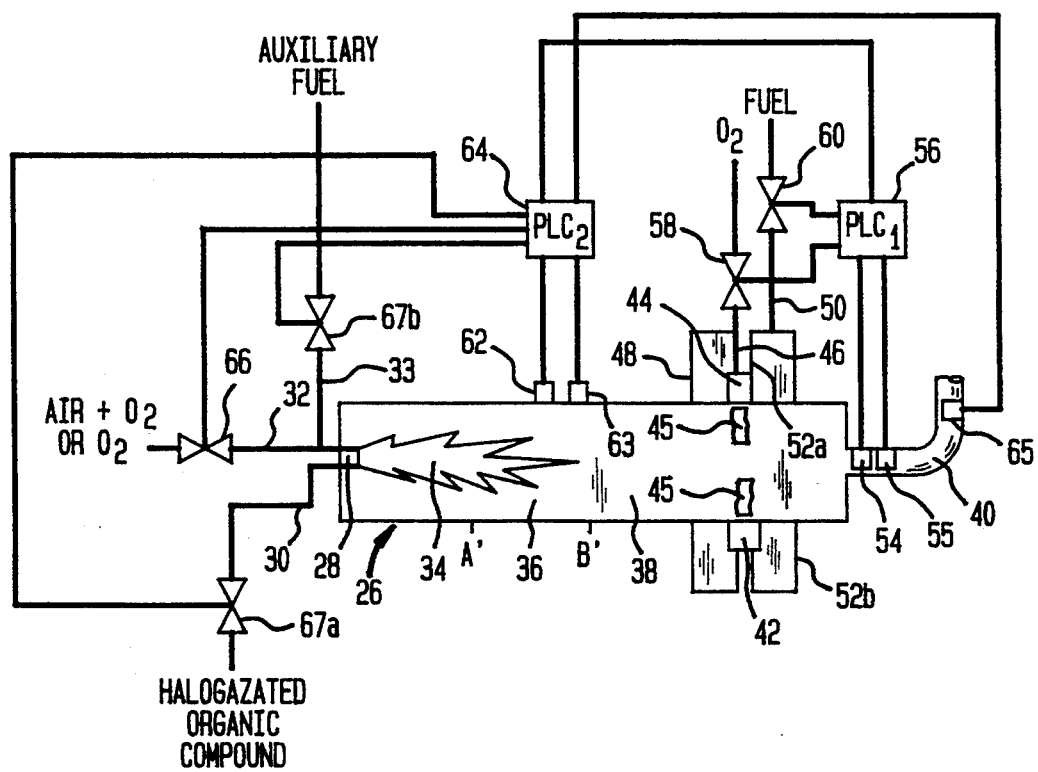
FIGS. 2(A), (B) and (C) are respectively: a schematic of an incinerator in accordance with the present invention, a graph of temperature versus distance within the incinerator, and a graph of percentage oxygen versus distance within the incinerator.

With reference to FIG. 2(A), an incinerator 26 in accordance with the present invention is illustrated. Incinerator 26 is provided with a burner 28 for burning a halogenated organic compounds in the presence of oxygen or oxygen-enriched air. Halogenated organic compounds enter burner 28 through fuel line 30 and oxygen-enriched air or oxygen enter burner 28 through oxidant line 32. An auxiliary fuel, such as methane, can be provided to burner 28 through auxiliary fuel line 33. It is understood that burner 28 is conventional and as such is not illustrated in detail. No particular type of burner is preferred and in fact the present invention could serve as a retrofit on an existing incinerator. Although higher heating-value wastes or fuel can be blended in and/or co-fired, the need for such is greatly diminished if not eliminated by the use of oxygen-enriched air or oxygen as evidenced by the well known extension of the flammability limits. The halogenated organic compounds burn with a flame 34 within an incineration zone 36 of incinerator 26. Combustion products as a main combustion product stream are produced which cool down in a post-combustion zone 38 and which are discharged from incinerator 26 via an exhaust 40.

In order to minimize the formation of halogenated furans and dioxins, a pair of burners 42 and 44 are provided which burn under fuel-rich conditions with flames 45 firing into post-combustion zone 38 to introduce a reactive combustion product stream into the post-combustion zone 38. It is understood that in smaller incinerators only one burner, such as burners 42 an 44, would be used. The design of burners 42 and 44 will be discussed hereinafter. Oxygen enters burners 42 and 44 via main oxygen line 46 and branch oxygen line 48 and fuel, preferably methane or some other hydrogen containing fuel, enters burners 42 and 44 from fuel line 50 which branches into branch lines 52a and 52b.

The fuel-rich combustion of burners 42 and 44 acts as an oxygen sink for removing unreacted oxygen from post-combustion zone 38 by supplying unburned fuel. In addition, the combustion of the hydrogen-containing fuel injects hydrogen into post-combustion zone 38 which reacts with halogenated furans and dioxins that have formed within the combustion zone. The combination of the oxygen sink and the introduction of reactive hydrogen provided by burners 42 and 44 reduces the formation of polyhalogenated furans and dioxins.

Figure 2B:
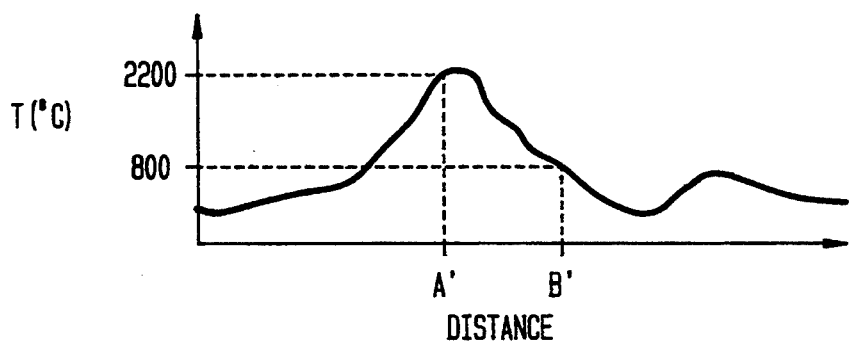
Figure 2C:
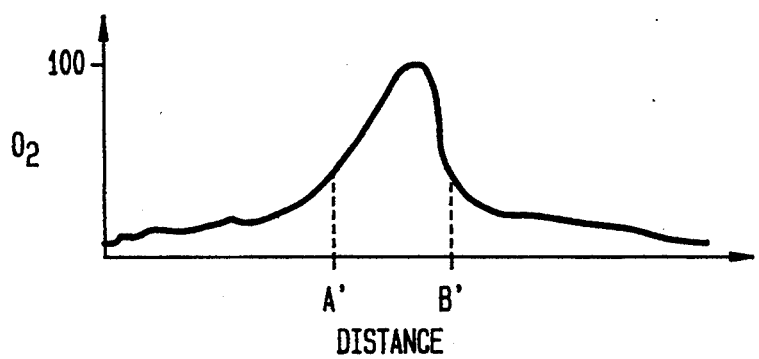

As can best be seen in FIG. 2(B) and 2(C), the distance between points A' and B', namely the distance within the burner between peak temperature and 800° is much shorter than points A and B of the prior art burner illustrated in FIGS. 1 (A)-(C). This is the result of the higher heat loss of flame 34 caused by using oxygen-enriched air or oxygen as oxidant. Additionally, the hydrogen containing fuel is supplying hydrogen which will react with halogenated furans and dioxins. The end result is that the halogenated furans and dioxins being expelled through exhaust 40 are minimized.

Burners 42 and 44 could be set at a constant fuel to oxygen ratio if the type and quantity of halogenated organic compound were constant. For instance, if the incineration is to be conducted as a batch process. If however, the incineration is being conducted as a real time process, the type and quantity of the compounds vary and hence, the amount of unreacted oxygen present within post-reaction zone 30 will also vary. As a result, the combustion conditions of burners 42 and 44 must also vary. The combustion conditions that are controlled are the exhaust gas temperature and the concentration of oxygen within the exhaust. If the temperature of the exhaust is too low, carbon monoxide will not oxidize and will appear in the exhaust 40 and if the temperature is too high, the zone between A' and B' will lengthen to increase the output of halogenated furans and dioxins. The limitation and control of oxygen ensures, as mentioned above, that oxygen concentrations will be sufficiently low to limit the amount of unreacted oxygen present that could react to form the furans and dioxins.

In accordance with the above discussion, a first oxygen sensor 54 can be provided to sense the amount of oxygen present within exhaust 40. Additionally, a first temperature sensor 55 can be used to sense the exhaust gas temperature within exhaust 40. Oxygen concentration and temperature are then fed into a first programmable logic computer 56 which in response to such inputs controls first and second control valves 58 and 60 to control the mass flow rates of oxygen and fuel being fed to burners 42 and 44.

It is additionally important to control the incineration of the halogenated compounds so that the composition of the feed to post-combustion zone 38 does not vary widely. Wide fluctuations in oxygen concentration would make it nearly impossible from a control-stability standpoint to maintain the requisite low oxygen concentration within exhaust 40. Moreover, if the incineration is conducted at too low a temperature, destruction of the halogenated organic compounds will not be assured. High temperatures can also exceed the operational limitation of the incinerator. Therefore, oxygen concentration and temperature within post-combustion zone 38 is sensed by a second oxygen sensor 62 and a second temperature sensor 63. The signals developed by such sensors are then fed to a second programmable logic computer 64 which also responds to a carbon monoxide sensor 65 located within exhaust 40. Programmable logic computer 64 in turn controls a third control valve 66 to control the amount of oxygen or oxygen-enriched air being introduced to burner 28 and fourth and fitch control valves 67a and 67b to respectively meter the flow rate of halogenated organic compound and auxiliary fuel also being fed to burner 28.

The level of CO in the exhaust is indicative of the completeness of the dehalogenation reactions in the incineration process. Essentially the halogens can be stripped from the halogenated dioxins/furans as HF, HCl, HBr and HI and are extremely stable species. During the dehalogenation process the scavaging of H radicals by halogens ceases the all-important chain-branching reaction:

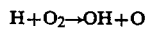

This in turn inhibits the most effective route for carbon monoxide oxidation:

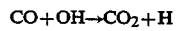

It can be seen, hence, that high CO levels are indicative that the waste or halogenated organic compounds have not been destroyed. Third control valve 66 is also controlled to meter the oxygen or oxygen enriched air being supplied to the incineration of the halogenated organic compounds so that carbon monoxide is within a range that is indicative of the destruction of the halogenated organic compounds.

Figure 3:
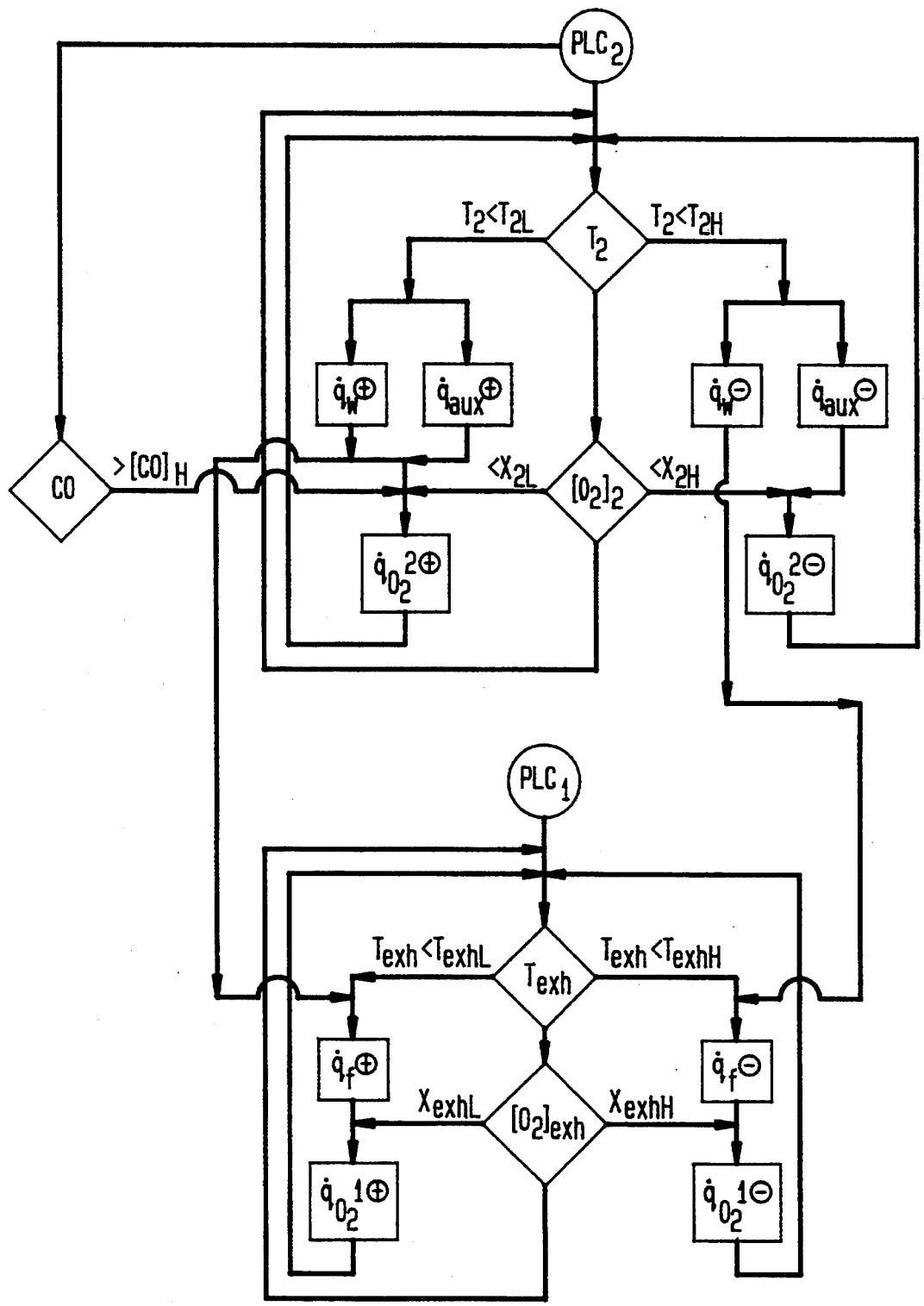
FIG. 3 is a schematic logic diagram of the programming of programmable logic computers utilized in the incinerator illustrated in FIG. 2(A).

With reference to FIG. 3, a logic flow sheet is shown which illustrates the logic behind the programming of first and second programmable logic computers 56 and 64. In the illustration, PLC, is first programmable logic computer 56 and PLC2 is second programmable logic computer 64. The term "$X_{exh}$" is the oxygen concentration sensed by first oxygen sensor 54 and the term "$T_{exh}$" represents a temperature sensed by first temperature sensor 55. The terms "$q_f$" and "$q^1_{O_2}$" are respectively the mass flow rates of fuel and oxygen flowing to bunkers 42 and 44. The term "$[O_2]_{exh}$" within the diamond symbol is a preset range of oxygen concentration desired within exhaust 40 and the term "$T_{exh}$" within the diamond symbol is a preset temperature range to be maintained within exhaust 40.

The terms $[O_2]_2$ and $T_2$ located within the diamond symbols represent the ranges of oxygen concentration and the temperature to be maintained within post-combustion zone 38. The terms $X_2$ and $T_2$ are respectively the temperature and oxygen concentration sensed by second oxygen sensor 62 and second temperature sensor 63. The terms $q_w$ and $q_{aux}$ represent the flow rates of halogenated organic compound and auxiliary fuel to burner 28. The term $q^2_{O_2}$ indicates the mass flow rate of oxygen-enriched air or oxygen into burner 28. CO is the carbon monoxide concentration sensed by carbon monoxide sensor 65 and [CO] within the diamond symbol is a maximum value of carbon monoxide concentration to be maintained within exhaust 40.

In general, the term $\oplus$ represents a constant stepped increase in mass flow rate while the symbol $\ominus$ represents a series of downward steps of mass flow rate. Any term having a subscript "L" or "H" represents the low and high pans of a range that has been input into either PLC$_1$, or PLC$_2$. In this regard, $X_{2L}$ and $X_{2H}$ is the low and high components of the oxygen concentration range ($[O_2]_2$) to be maintained within post-combustion zone 38. As can be appreciated, such range would be an input to second programmable logic computer 64.

The controlled range of exhaust temperature within exhaust 40 will be typically in a range of about 700° C. and about 800° C. Additionally, the allowable oxygen concentration within exhaust 40 will typically be in a range from about 0.5% and about 2.5%. Therefore, for exemplary purposes, $T_{exhL}$ will be set equal to 700° C., $T_{exhH}$ to 800° C., $X_{exhL}$ to 0.5% and $X_{exhH}$, to 2.5% within inputs to first programmable logic computer 56. The temperature range for post-combustion zone 36 is typically in a range from about 1500° C. and about 1600° C. Therefore, $T_{2L}$ is typically set at 1500° C. and $T_{2H}$ is typically set at 1600° C. by suitably providing inputs to second programmable logic computer 64. Additionally, the oxygen present within the combustion products has to be controlled. The oxygen range to be maintained within post-combustion zone 36 will commonly be set within second programmable logic computer 64 in a range of between about 1% and about 6%. Thus, $X_{2H}$ commonly is equal to 1% and $X_{2H}$ is set at 6%. Typically carbon monoxide levels are controlled to be anywhere below a value in a range of about 200 and about 1000 ppm. Therefore, [CO] is set somewhere between 200 and 1000 ppm.

After first and second programmable logic computers 56 and 64 are set with the appropriate inputs, first, second, third, fourth and fifth control valves 58, 60, 66, 67a and 67b are then appropriately set so that the exhaust gas temperature, oxygen concentration and carbon monoxide concentration, and post combustion zone temperature and oxygen concentration are within the foregoing ranges.

If $T_{exh}$ as sensed by first temperature sensor 55 is less than $T_{exhL}$ then second control valve 60, in steps, opens to allow progressively more fuel to burners 42 and 44. In conjunction, first control valve 58 is opened to maintain the fuel-rich stoichiometry of burners 42 and 44. In this regard, the degree to which first and second control valves 58 and 60 are open is continually monitored by first programmable logic computer 56. Additionally a ratio between the degree to which first and second control valves 58 and 60 are open is computed and recorded. In order to maintain the fuel-rich stoichiometry, first control valve 58 is opened so that the ratio of opening between first and second control valves 58 and 60 is preserved. Alternatively, if $T_{exh}$ is greater than $T_{exhH}$ then second control valve 60 closes in steps until $T_{exh}$ is within the range input into first programmable logic computer 56. First control valve 58 closes proportionally, in the manner outlined above, to maintain the fuel-rich stoichiometry. After each step, the temperature is checked. When the desired temperature is within the range, the oxygen concentration, $[O_2]_{exh}$ is then checked upon measurement by first oxygen sensor 54 so that a further adjustment of first control valve 58 can be made by first programmable logic computer 56 to increase or decrease the mass flow rate of oxygen being introduced into burners 42 and 44 so that $[O_2]_{exh}$ is within the range of $X_{exhL}$ and $X_{exhH}$.

In operation, if the temperature sensed by second temperature sensor 63 is either below or above $T_{2L}$ or $T_{2H}$, fourth and fifth control valves 67a and 67b (in conjunction third control valve 66 to maintain stoichiometry) are opened and closed, as the case may be, in steps until temperature $T_2$ is within limits. The opening and closing of fourth and fifth control valves 67a and 67b control $q_w$ and $q_{aux}$, which are not separately monitored by flow meters in the illustrated embodiment. Stoichiometry is maintained by proportionally opening third control valve 66 so that a ratio of the degree to which it is opened as compared to fourth control valve 67a, as last computed, is preserved. After each step temperature $T_2$ is checked. Once the temperature is sensed to be within the programmed operating range, oxygen is sensed by second oxygen sensor 62 and is measured. If the oxygen is either below $X_{2L}$ or above $X_{2H}$, third control valve 66 is further commanded to open and close to adjust the oxygen level, also in a step-wise fashion. After each step, oxygen concentration as well as temperature is tested.

As the amount or type of either halogenated organic compounds or auxiliary fuel supplied to burner 28 varies, the amount of post-flame compounds such as furans and dioxin in need for destruction will also vary. In response to the increase or decrease in mass flow rates $\dot{q}_w$ and $\dot{q}_{aux}$, second control valve 58 is commanded to open or close in line with a respective increase or decrease of the flow of halogenated organic compounds to burner 28 and thereby supply the requisite amount of hydrogen to react in the dehalogenation reactions with the halogenated furans and dioxins. This is effected by opening second control valve 60 so that a ratio between the degree to which second control valve 60 is open and fourth control valve 67a is open is initially maintained. This ratio is computed in second programmable logic computer 64 which in turn activates first programmable logic computer 56 to appropriately command second control valve 60. Additionally, first control valve 58 proportionally opens, as outlined above, to maintain the fuel-rich stoichiometry of the combustion of burners 42 and 44.

As stated previously, $\dot{q}_w$ and $\dot{q}_{aux}$ are controlled so that the temperature of combustion within post-combustion zone 38 is within appropriate levels. If for instance it is known that the halogenated organic compounds to be processed have a sufficiently high heating value, $\dot{q}_{aux}$ would be 0 and fifth control valve 67b would be set in a closed position or might be eliminated from the loop entirely. Thus, only $\dot{q}_w$ would only ever be adjusted. If it were known that the heating value of the waste to be treated was constant and constantly low, then the amount of auxiliary fuel to waste could be adjusted in a constant ratio. Thus, valves 67a and 67b would always be incrementally opened by the same amount to preserve such ratio.

In the event that the heating value of the waste to be treated varies and is not sufficient to support a stable flange within burner 28, the mass flow rates of the waste and the auxiliary fuel must be varied upon the sensing of a temperature by second temperature sensor 63 so that $T_2$ is within the range of $T_{2L}$ and $T_{2H}$. Such variation can be made to take place by first stepping up the mass flow rate of the halogenated organic compounds to be incinerated and sensing the temperature by first temperature sensor 63. This increase in temperature can be correlated with the heating value of a standard fuel having a known heating value, for instance, methane. Then by use of a look-up table, the mass flow rate of the auxiliary fuel, also having a known heating value, will be suitably stepped up or down to a required mass flow rate sufficient to raise or lower the temperature within the requisite range. Once that temperature is in the range, the oxygen concentration can then be sensed by second oxygen sensor 62 and the amount of oxygen will then be adjusted so that the oxygen concentration was in the range. Carbon monoxide will additionally be sensed by carbon monoxide sensor 65 to fine tune the oxygen mass flow rate. In this regard, after post-combustion zone temperature and unreacted oxygen concentrations within post-combustion zone 38 are sensed and determined to be within appropriate levels as outlined above, oxygen or oxygen-enriched air supplied to burner 28 is then stepped up, as necessary, by appropriate control of third control valve 66 until the carbon monoxide is at or below the maximum preset value [CO].

In an application of the present invention in which the concentration of the unreacted oxygen as well as the halogen to hydrogen ratio of the waste did not vary widely and maintained fairly constant levels, second programmable logic computer 64, second oxygen sensor 62, third control valve 66 and CO sensor 65 could be deleted. In such an application, the oxygen concentration within exhaust 40 could be measured and first control valve 58 could then be adjusted to maintain the oxygen concentration within a desired range.

With reference to FIGS. 4, 5, 6 and 7A–7D, a burner design employed for burner 42 is illustrated. Burner 44 would be constructed in the same manner. Burner 42 includes a central nozzle 68, which, as will be described, is designed to produce an oxygen jet of outwardly divergent, fan-shaped configuration. Fuel nozzles 69 and 70 are provided for producing fuel jets of outwardly divergent, fan-shaped configuration sandwiching the oxygen jet. The fuel jets of fuel nozzles 69 and 70 have a lower velocity than the oxidant jet. As a result, the fuel has a higher pressure than the oxygen and the fuel tends to aspirate into the oxygen. Thus, a high velocity oxygen jet is shielded by low velocity fuel jets.

Burner 42 is provided with a body portion 72 of elongated configuration having top and bottom walls 74 and 76 and side walls 78 and 80. Angled reinforcement members 82–88 are provided to stiffen body portion 72. Central oxygen nozzle 68 divides body portion 72 into fuel nozzles 69 and 70 which include passageways 90 and 92 having outlets 94 and 96 and inlets 98 and 100.

A coupling assembly 102 is connected to the rear of body portion 72 to introduce fuel into body portion 72 which in turn flows into inlets 98 and 100 of fuel nozzles 69 and 70 and thereafter, flows out of outlets 94 and 96 thereof. In practice, coupling assembly 102 would be connected to fuel line 50.

Central oxygen nozzle 68 is supported within body portion 72 by sets of vanes 104 and 106. Vanes 104 and 106 are connected to walls 74 and 76 and to central oxygen nozzle 68. Vanes 104 and 106 divide passageways 90 and 92 in the lengthwise direction and therefore the flow of fuel passing through passageways 90 and 92 into a plurality of subflows. Vanes 104 and 106 are specifically designed such that the velocities of the subflows will have an essentially equal magnitude and be oriented so as to gradually diverge in a transverse direction to the flow of the fuel. This is effectuated by outwardly curving vanes 104 and 106 which are designed such that tangents drawn at their maximum curvatures all intersect at one location within the respective of the passageways 90 and 92 of which vanes 104 and 106 subdivide. Although hidden in the illustration, the vanes extend rearwardly to the inlets 98 and 100 of fuel nozzles 69 and 70. A further advantage of the vaned fuel nozzles is that the vanes allow for effective self cooling of burner 42 without external water cooling.

Central oxygen nozzle 68 is preferably formed in two sections 108 and 110. Central oxygen nozzle 68 is in the form therefore of a central body portion having a chamber 112 and a plurality of passageways 114 of equal length, spaced apart from one another, and gradually fanning out from chamber 112. Chamber 112 communicates between passages 114 and a fuel inlet 116 such that oxygen flows from fuel inlet 116 and out of passages 114. Passages 114 gradually fan out from chamber 112 so that the resultant oxygen jet will fan out. The equal length of passages 114 produce an equal pressure drop and therefore equal velocity so that the oxygen jet will fan out or horizontally diverge with little decay. A conduit 118 of rectangular-transverse cross-section connects to a coupling 120 by means of a transition piece 122 which transitions from a circular, transverse cross-section to a rectangular, transverse cross-section. Coupling 120 is designed to be connected to oxygen line 48.

While the invention has been described with reference to preferred embodiment, it will be understood by those skilled in the art that numerous additions and omissions can be made without departing from the spirit and scope of the invention.

I claim:

1. A method of incinerating halogenated organic compounds, said method comprising:

incinerating the halogenated organic compounds in the presence of excess oxygen or oxygen enriched air to produce a main combustion product stream including halogenated furans, unreacted oxygen and halogen-containing organic compounds;

burning, at a fuel-rich stoichiometry, a hydrogen-containing fuel in the presence of additional oxygen to produce a reactive combustion product stream therefrom containing unburned hydrogen-containing fuel and hydrogen supplied by the fuel and supplying said reactive combustion product stream to said main combustion product stream so that the unreacted oxygen reacts with the unburned hydrogen-containing fuel to reduce formation of the halogenated furans and dioxins that otherwise would have been formed in the main combustion product stream through reactions between the unreacted oxygen and halogen containing organic compounds and the halogenated furans and dioxins that are produced within the main combustion product stream react with the hydrogen supplied by the fuel and decompose through dehalogenation reactions;

the reactive combustion product stream being added to the main combustion product stream at a temperature lower than that of said incineration and; after the exposure of the combustion products to the burning of the hydrogen-containing fuel, discharging the combustion products as an exhaust, the concentration of the halogenated furans and dioxins being less than that which would otherwise have been produced within the combustion products contained within the exhaust.

2. The method of claim 1, further comprising:
   measuring exhaust oxygen concentration of the unreacted oxygen within the exhaust; and
   metering the additional oxygen supplied to the burning of the hydrogen-containing fuel so that said exhaust oxygen concentration is within an exhaust oxygen concentration range of between about 0.54% and about 2.5% in which the reduction of the formation of the halogenated furans and dioxins is promoted.

3. The method of claim 2, further comprising prior to measuring exhaust oxygen concentration and metering the oxygen, measuring exhaust gas temperature of the exhaust and metering the hydrogen-containing fuel so that the exhaust gas temperature is within an exhaust gas temperature range, of between about 700° C. and 800° C.

4. The method of claim 3, further comprising:
   conducting the incineration and the burning of the hydrogen-containing fuel within an incinerator having an incineration zone for incinerating the halogenated organic compounds and a post combustion zone for receiving the combustion products from the incinerator zone and for burning the hydrogen-containing fuel;
   measuring post-combustion zone temperature within the post combustion zone and metering the halogenated organic compounds supplied to the incinerator so that post-combustion zone temperature is within a post-combustion zone temperature range, of between about 1500° C. and about 1600° C.;
   while the halogenated organic compounds are metered, metering the oxygen or oxygen enriched air supplied to the incineration of the halogenated organic compounds to maintain stoichiometry of said incineration; and
   after the post combustion zone temperature is within the post-combustion zone temperature range, measuring incinerator oxygen concentration and further metering said oxygen or oxygen enriched air so that said incinerator oxygen concentration is within an incinerator oxygen concentration range of between about 14% and about 64%.

5. The method of claim 4, further comprising measuring a carbon monoxide concentration within said exhaust and still further metering the excess oxygen or oxygen-enriched air supplied to said incineration of the halogenated organic compounds so that the carbon monoxide level is within a range of about 200 and 100 ppm.

* * * * *